Patented Nov. 7, 1939

2,179,122

UNITED STATES PATENT OFFICE 2,179,122

METHOD OF SMOKING FISH

Roy Gamble, Tacoma, Wash.

No Drawing. Application November 21, 1938,
Serial No. 241,607

7 Claims. (Cl. 99—160)

My invention relates to the preparation of fish, particularly salmon, for food and has for its objects to improve, first, the salability of the smoked fish by improvements in its form, its color, and its flavor, as well as in the means used to expose it for sale; second, to delay the development of mold on the fish over a longer period than is common; third, to reduce the time necessary to produce a smoked fish; and fourth, to improve the texture of the resulting smoked flesh of the fish.

Two forms of smoked salmon are on the market at the present time, known respectively as the "Indian" and the "mild". The "Indian" type of smoked salmon is obtained by preserving the fish sides in strong brine and later exposing the whole sides of the fish for from ten to fourteen days to cool smoke and results in a dried, tough, very salty and substantially raw food. The "mild" type is similarly preserved and later the full sides of the fish are exposed to cool smoke for five or six days and results in a salty and substantially raw food. In neither of these forms of preparing fish for food is it practical to cut the fish into meal-size pieces before it is smoked because the long exposure to the smoke renders them entirely too dry to be palatable.

The fish prepared by my process are cooked and not raw; resilient and not hard; moist and not dry; tender and not tough; firm but not brittle, are prepared in meal-size chunks; have a distinctive and unique flavor, color, and aroma and are exposed for sale in wide-mouthed gallon glass jars containing usually twenty-one pieces. Further, my process takes less than two days to complete and the product is so much improved over the known smoked or kippered salmon that though the merchant makes less profit on each sale, the sales are quicker and his total weekly profit is larger, with the result that my product is constantly displacing the old wherever I have introduced it.

As before stated, the first of both the other types are preserved by being salted down in very strong brine and may remain in this brine for from a month to over a year and become thoroughly impregnated with salt. They are taken from this preserving vat and then smoked as above described. The fish used in my process are not preserved in brine but may be either fresh or frozen, that is to say, before my process is applied to the fish, the flesh is fresh and not saturated with salt. The fish selected for treatment should weigh, when cleaned and decapitated, from nine to sixteen pounds.

My process consists of the following steps of operation and of treatment:

The fish are first prepared for the process by trimming the bellies out of the fish, by cutting well up on the sides of the fish to where the flesh is at least about one-half an inch thick between the ribs and the skin. Then the fish are split and the backbone is removed. This leaves two nearly boneless sides of salmon, with the skin on.

The first step in the process, after the fish are thus prepared, is the salting step, for flavor. The fish sides are laid, skin side down, and are sprinkled with dry table salt, using about 4½ pounds of salt to 100 pounds of fish. A layer of fish is thus laid down and the salt is sprinkled thereon, then another layer is laid thereon and similarly sprinkled, and so on until a depth of about one foot is attained. The sides are left in the salt for about twelve hours, after which the surplus unabsorbed salt is removed by quickly rinsing the fish in running fresh water.

The salted and washed sides of salmon are then laid on the cutting board and all fins are trimmed off, as are also the thinned edges which, otherwise, would dry and curl in the hot smoke. Then a very sharp knife is used to cut the sides into strips which may be from one inch to an inch and a half in width and may weigh about four to five ounces. In this step the knife must be very sharp to insure smooth and even sides to each strip of fish.

The pieces or strips of fish are then placed on trays made of wire netting stretched on wooden frames. A space of about one-half inch is left between the respective strips to prevent them from sticking together and to insure access by the smoke to the whole surface of each strip of fish. The trays are then placed in the smoke house over a slow fire of green alder or other suitable wood, burning in an open pit in the floor of the smoke house. The temperature in the smoke house is maintained at 140° to 160° Fahrenheit, for from eight to ten hours.

The trays are preferably stacked in the smoke house in a suitable frame whereby they are kept about two inches apart, vertically, and are periodically shifted in the frame by moving the lowest tray to the top of the stack and then moving each tray downward one position. This shifting may be done every two to four hours. The time required in the hot smoke house depends to some degree on the shifting of the trays therein. This exposure to a comparatively hot temperature slowly cooks the fish which, being in small chunks, as above described, cooks evenly throughout.

The trays of cooked fish are then taken out of the smoke house and the fish strips are sprayed with a suitable oil, such as "Wesson oil", while they are very hot, until each piece is coated with a film of oil.

The trays of fish are then returned to the smoke house in which the temperature has been reduced to from 95° to 105°, at which temperature it is maintained for from fourteen to sixteen hours.

When the fish are finally removed they are again sprayed with the same type of oil.

The fish are now allowed to cool and are packed in wide-mouthed gallon jars, twenty-one pieces to the jar, to be displayed upon the counter of the merchant.

The jars are prepared to receive the fish by having a disk of absorbent paper or corrugated fiber board placed in its bottom, the purpose of this disk being to absorb the moisture caused by the condensation in the jar due to changes in temperature of the room in which the jar is displayed.

As before stated the first exposure of the fish in the hot smoke is primarily to partially cook the fish. The temperature must be closely watched to keep the smoke house from getting too hot in order to prevent the fish from becoming dry and hard.

The first spraying of the oil on the hot fish is to act as a carrier for the taste of the smoke enabling the fish to take up or absorb the flavor of the smoke during the second, or cooler, exposure in the smoke house. The oil absorbs the smoke flavor and soaks into the fish, carrying the smoke flavor with it, thus reducing the time needed to properly and thoroughly flavor the fish. The oil also prevents the fish from becoming case-hardened and prevents the salt from oozing out of the fish flesh, and gives the fish a good color. This first oil is entirely absorbed by the fish during the second smoking step. The second or final application of the oil is largely to brighten it and to improve its taste and color, to protect the fish from mildew and to render the product more palatable and salable.

Thus it will be seen that I have produced a new form of smoked salmon, distinguished by its form, color and flavor from any smoked or kippered salmon heretofore on the market and that this new product is produced by means of the new process, above described, which is characterized by the high or cooking temperature of the smoke house, by the short time that the salmon is exposed to the smoke, by the applying of an oil to the fish while hot, and by the subsequent cool smoking of the salmon. The food thus produced has proved to be a very attractive article of food, with the result that the demand for this form of fish is constantly increasing.

It is, of course, to be understood that variations may be made in the details of the above-described process and product without departing from the spirit of my invention as outlined in the appended claims, and that the words and terms used in the specification and claims have been chosen for convenience and are to be given the most generic meaning permitted by the state of the art.

Having, therefore, described my invention, what I claim and desire to secure by Letters Patent, is:

1. The method of cooking fish which comprises salting the fish sides for flavor; cutting the salted fish sides into small chunks; exposing the fish chunks to a slow cooking heat in the presence of smoke; coating the hot fish chunks with oil; exposing the oiled chunks to a reduced heat in the presence of smoke; and applying a second coating of oil.

2. The method of cooking fish which comprises salting the fish sides for flavor; cutting the salted fish sides into small chunks; exposing the fish chunks to a slow cooking heat in the presence of smoke; coating the hot fish chunks with oil; and exposing the oiled chunks to a reduced heat in the presence of smoke.

3. The method of cooking fish which comprises cutting the fish into small chunks; exposing the fish chunks to a slow cooking heat in the presence of smoke; coating the hot fish chunks with oil; and exposing the oiled chunks to a reduced heat in the presence of smoke.

4. The method of cooking fish which comprises exposing the fish to a slow cooking heat in the presence of smoke; coating the hot fish with oil; and exposing the oiled fish to heat in the presence of smoke.

5. The method of cooking fish which comprises cutting the fish into small chunks; exposing the fish chunks to a slow cooking heat in the presence of smoke; periodically shifting the position of the fish chunks while cooking; coating the hot fish chunks with oil; and exposing the oiled chunks to heat in the presence of smoke.

6. The method of cooking fish which comprises exposing the fish to a slow cooking heat in the presence of smoke; periodically shifting the position of the fish while cooking; coating the hot fish with oil; and exposing the oiled fish to heat in the presence of smoke.

7. The method of cooking fish which comprises packing the fish sides in salt, using about 4½ pounds of salt to 100 pounds of fish, for a period of about 12 hours; rinsing off the unabsorbed salt; cutting the fish sides into chunks; partially cooking the fish at a temperature of from 140° to 160° Fahrenheit, in the presence of smoke for a period of from 8 to 10 hours, and periodically shifting the position of the fish while cooking; coating the hot fish with oil; and smoking the said oiled fish at a temperature of from 95° to 105° Fahrenheit, for from 14 to 16 hours.

ROY GAMBLE.